United States Patent [19]

Stearns

[11] 3,781,909

[45] Dec. 25, 1973

[54] REDUCED ITERATION IN COMPUTER COLOR MATCHING

[75] Inventor: Edwin Ira Stearns, Westfield, N.J.

[73] Assignee: American Cyanamid Company, Stamford, Conn.

[22] Filed: Mar. 15, 1971

[21] Appl. No.: 124,478

[52] U.S. Cl. .................................. 235/150, 356/173

[51] Int. Cl. ........................................................ G06f

[58] Field of Search .................. 356/173, 256; 8/25; 464/1

[56] References Cited

OTHER PUBLICATIONS

Friedlander (editor), Int'l Journal of Computer Mathematics, Vol. 1, No. 2, January 1965, pp. 91–95.

*Primary Examiner*—Ronald L. Wibert
*Assistant Examiner*—R. J. Webster
*Attorney*—Samuel Branch Walker

[57] ABSTRACT

Digital computer color matching of a plurality of colorants to a target color involves usually repeated iterations in computing the final match. Excessive number of iterations results when the computation first shows that a certain amount of color must be added to the formula and in the next iteration a certain amount subtracted. There is described an improved method and programmed computer for reducing iterations under such circumstances by programming the computer so that whenever an iteration has a different sign in the calculation than the immediately preceding iteration, i.e., first add then subtract or vice versa; the second quantity is reduced to a fraction, for example 1/2. and this amount is used in the next iteration.

2 Claims, No Drawings

REDUCED ITERATION IN COMPUTER COLOR MATCHING

BACKGROUND OF THE INVENTION

Color matching of a plurality of colorants to a target color by digital computer computation always requires final computations which include iterations. After each iteration the computer compares the match with the target, and if the difference is greater than a predetermined value, applies this difference in the next iteration. Excessive iterations, i.e., slow convergence, often result when one iteration indicates a correction with one sign and the next one a correction with the opposite sign. For example, if the first iteration required adding one or more colorants and the next one subtracted, or vice versa, this results almost always in very slow convergence and hence excessive iterations, and is one of the more common causes for excessive iterations and therefore of excessive computer costs. Hitherto this has been accepted in computer color matching as an unavoidable price for the important advantages of this type of color matching. A short pertinent discussion and set of equations is set forth in Eugene Allen, Basic Equations Used in Computer Color Matching, Journal of the Optical Society of America, Vol. 56, No. 9 1256–1259, Sept. 1966. A more detailed explanation appears in the text "The Practice of Absorption Spectrophotometry," E. I. Stearns, John WIley & Sons, New York, 1969 , (353 + xi pages). In the patent literature, equations and a program appear in S.N. 84,095, E. M. Allen, Computing Dye Blends for Color Matching. These are herein hereby incorporated by reference, to avoid unduly lengthening this specification.

SUMMARY OF THE INVENTION

In the present invention when a digital computer shows on a second or subsequent iteration that the amount of a colorant to be added changes sign; for example if the first iteration indicated that ten parts of a colorant has to be added to the formula and the next iteration after the addition showed that, say, nine parts of the colorant must be subtracted, or vice versa, whenever an iteration shows a change of sign, the quantity is reduced to a fraction. This reduces overshoot and decreases the number of iterations required. Digital computers, of course, can divide the quantity very quickly, and the single rapid division adds negligibly to the total time of color matching but can reduce iteration very greatly, resulting in a large net savings of computer time. In spite of the great speed of modern digital computers, their time charges are quite high, especially with time shared computer centers, and the savings obtainable by the present invention are substantial wherever color matching shows up matches with the change of sign on successive iterations. It should be noted that the present invention is directed only to the field of computer color matching because it is in this field that excessive iterations, when they occur for the reasons set out above, can result in very significant increase in cost, and of course time for making a match, though this latter factor is usually commercially less important than cost savings.

The present invention is not limited to an exact fraction, but of course there are practical considerations. If the fraction is too big, for example much more than two-thirds, the savings in iteration will be greatly decreased. Also, if the fraction is too small, this is also not desirable. A good practical range is between one-third and two-thirds, though the exact ends of the ranges are in no sense critical. As it is very easy for a computer to divide by two, this is preferred.

Color matching by computer most commonly involves three-colorant matches, but occasionally there will be a two-colorant match, and for some special situations, more than three, such as four or five, colorants may be required. Regardless of the number of colorants in the match, iterations are always needed in the computations, and wherever the iteration show corrections of alternating signs the present invention is useful. It is, therefore, not intended to limit the present invention to three-colorant matches. It should be noted that the present invention is concerned only with the iterations in the final calculation. The rest of the program is not changed by the present invention, and it should be realized that the present invention, therefore, is applicable to a number of programs. For example, if the computation is to extend to four or more colorants provided a three-colorant match of desired perfection is not achieved, programs will be somewhat different, and the present invention is therefore not concerned with the details of any parts of the programs used except at the point where iterations are controlled. The fact that the present invention can be used with a large number of programs is an advantage. The revision of a program to include the present invention does not require rewriting any significant amount of the program. A few lines at the point where the computer is controlled in iteration are all that are needed.

DESCRIPTION OF THE PREFERRED EMBODIMENTS

Since the present invention does not change or need not change most parts of the programs which control the digital computer and which turn it into a special purpose computer while under the direction of such a program, in the following example, which will include some lines of Fortran suitable for an IBM computer 360, only sufficient of the other portions of the program will be illustrated to show where the change effected by the present invention takes place. This is only a few lines, and the specification will, therefore, not be confused by the inclusion of a large amount of programs or portions thereof which are not changed by the present invention and with the details of which, therefore, the present invention is not concerned. Also, for simplicity the specific Fortran program portions will relate to calculations for three-component matches. The orders for dividing the amount to be incorporated in the formula by any iteration are not changed, though of course the preceding line or two of a program involving the iteration will be somewhat different depending on what the program as a whole is trying to accomplish. The present description, therefore, is only one typical illustration and the invention is not limited to the exact details thereof.

In the following Fortran program lines a preferred division by two is illustrated as this is the simplest and the preferred fraction, but the invention may use as others, as has been set out more generally above. The portions of the program incorporating the present invention into a part of a standard three-color matching program are as follows:

```
1030 9DO1J=1,3
```

```
1040 1C(J+1)=C(J+1)+DEX(1)*AMAT(1,J)+DEX(2)*AMAT(2,J)+DEX(3)*AMAT(3,J)
1140 18DO134K=1,16
1150 RS(K)=FD(K,1)+C(2)*FD(K,2)+C(3)*FD(K,3)+C(4)*FP(K)
1250 70 DO82K=1,16
1260 RS(K)=1.+RS(K)-SQRT(2.*RS(K)+RS(K)**2)
1270 IF(GF1.EQ.0..AND.GF2.EQ.0.)GOTO82
1280 RS(K)=GF1+(1.-GF1)*(1.-GF2)*RS(K)/(1.-GF2*RS(K))
1290 82CONTINUE
1300 DO5J=1,3
1310 X(J,4)=0.
1320 DO5K=1,16
1330 5X(J,4)=X(J,4)+RS(K)*W(J,K)
1340 IF(NB.NE.0)GOTO 66
1350 DO65J=1,3
1360 65 X(J,5)=X(J,4)
1370 66 CONTINUE
1380 DO8K=1,3
1390 8DEX(K)=X(K,3)-X(K,4)
1400 IF(ABS(DEX(1))+ABS(DEX(2))+ABS(DEX(3))-.002)6,6,7
1410 7IF(DEX(1)*A1)41,42,42
1420 42IF(DEX(2)*A2)41,43,43
1430 43 IF(DEX(3)*A3)41,44,44
1440 41 DO805=1,3;805DEX(K)=.5*DEX(K)
1450 44 NB=NB+1
1460 41=DEX(1);A2=DEX(2);A3=DEX(3)
1470 IF(NB-100)9,9,68
```

ITERATION LOOP GOES FROM 1030-1470

DEX(1),DEX(2),DEX(3) ARE PRESENT DIFFERENCES
A1,A2,A3 ARE PREVIOUS DIFFERENCES
IF THESE ARE OF OPPOSITE SIGN, LINES 1410-1430 ARE NEGATIVE
IF NEGATIVE, ALL DEX VALUES ARE MULTIPLIED BY .5 IN LINE 1440

I claim:

1. In a process of color matching with a general purpose digital computer having program instructions therein for matching a target color with a mixture of three colorants, including the following steps:

a. Executing a first set of said program instructions to write into the computer memory the absorption indices at N wavelengths spaced throughout the visual range of the colorants from which a color match is to be made, b. Executing a second set of said program instructions to calculate a set of three colorant concentrations that will give an approximate match to the target color. Executing a third set of said program instructions to iteratively improve said approximate match comprising improved colorant concentration amounts by determining incremental colorant concentration corrections using an equation of the form $$\Delta c = (TED\Phi)^{-1}\Delta t$$

where $\Delta c$ is a 3 × 1 matrix where each element represents an incremental concentration correction of colorants in the match T is a 3 × N matrix where the elements represent the three tristimulus values of monochromatic spectral radiant energy at said N intervals E is a diagonal matrix with N elements representing the spectral power distribution of a light source at each of said N wavelengths D is a diagonal matrix with N elements representing the reciprocal of the derivative of the function which relates the absorbance of a sample to the spectrophotometric measurement at each of said N wavelengths $\Phi$ is an N × 3 matrix of the absorptivities of the three colorants in the match at each of said N wavelengths $\Delta t$ is a 3 × 1 matrix where each element refers to an incremental tristimulus value d. Executing a fourth set of said program instructions to test for goodness of match after Step c has been carried out, and, in the event that the goodness of the match is not acceptable, e. Executing a fifth set of said program instructions to add the incremental concentrations to the earlier approximate match concentrations and determine a new set of incremental tristimulus values, f. Executing a sixth set of said program instructions to repeat Steps c, d & e until the goodness of match is acceptable, The improvement comprising:

g. Executing a seventh set of program instructions to test after Step c for whether the incremental concentration correction is of positive or negative sign, and in the event that in an iterative step said sign is opposite to the sign of the prior incremental concentration correction, then reducing the absolute value of the new incremental concentration correction to a fraction between one-third and two-thirds of said absolute value and then returning to step c.

2. The process of claim 1 in which in Step g. said fraction is ½.

* * * * *